(12) United States Patent
Hennion et al.

(10) Patent No.: US 11,331,885 B2
(45) Date of Patent: May 17, 2022

(54) ILLUMINATING GLAZING UNIT WITH THROUGH-HOLE FOR LIGHT INJECTION

(71) Applicant: SAINT-GOBAIN GLASS FRANCE, Courbevoie (FR)

(72) Inventors: Alexandre Hennion, Trie Chateau (FR); Mathieu Berard, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 247 days.

(21) Appl. No.: 16/499,585

(22) PCT Filed: Mar. 30, 2018

(86) PCT No.: PCT/FR2018/050792
§ 371 (c)(1),
(2) Date: Sep. 30, 2019

(87) PCT Pub. No.: WO2018/178591
PCT Pub. Date: Oct. 4, 2018

(65) Prior Publication Data
US 2021/0170724 A1    Jun. 10, 2021

(30) Foreign Application Priority Data
Mar. 31, 2017 (FR) ...................................... 1752762

(51) Int. Cl.
*B60Q 3/64* (2017.01)
*B60Q 3/208* (2017.01)
(Continued)

(52) U.S. Cl.
CPC .. *B32B 17/10541* (2013.01); *B32B 17/10036* (2013.01); *B32B 17/10293* (2013.01);
(Continued)

(58) Field of Classification Search
CPC .............. B60Q 3/208; B32B 17/10293; B32B 17/10541; F21S 43/239; F21S 41/24;
(Continued)

(56) References Cited

U.S. PATENT DOCUMENTS

2003/0235050 A1* 12/2003 West .................. G02B 19/0071
362/327
2006/0285356 A1* 12/2006 Tseng .................. G02B 6/0016
362/608
(Continued)

FOREIGN PATENT DOCUMENTS

FR    3 028 073 A1    5/2016
JP    2012-503782 A   2/2012
(Continued)

OTHER PUBLICATIONS

International Search report as issued in International Patent Application No. PCT/FR2018/050792, dated Jul. 23, 2018.
(Continued)

*Primary Examiner* — Rajarshi Chakraborty
*Assistant Examiner* — Steven Y Horikoshi
(74) *Attorney, Agent, or Firm* — Pillsbury Winthrop Shaw Pittman LLP

(57) ABSTRACT

An illuminating glazing unit includes a first transparent sheet of glass drilled with a through-hole delimited by an internal wall; at least one inorganic light-emitting diode including an emission surface emitting light in a main direction of emission substantially orthogonal to the emission surface; and a light guide element including an input face arranged facing the emission surface, a body and an output face arranged facing the internal wall, the light-emitting diode having an emission cone of at least 80°.

24 Claims, 8 Drawing Sheets

(51) Int. Cl.
 B32B 17/10 (2006.01)
 F21V 8/00 (2006.01)
(52) U.S. Cl.
 CPC ........ B32B 17/10761 (2013.01); B60Q 3/208 (2017.02); B60Q 3/64 (2017.02); G02B 6/009 (2013.01); G02B 6/0018 (2013.01); G02B 6/0051 (2013.01); G02B 6/0095 (2013.01)
(58) Field of Classification Search
 CPC .... G02B 6/0021; G02B 6/0028; G02B 6/009; G02B 6/0091
 See application file for complete search history.

(56) References Cited

U.S. PATENT DOCUMENTS

| | | | | |
|---|---|---|---|---|
| 2007/0076433 A1* | 4/2007 | Kinoshita | ............ | G02B 6/0028 362/615 |
| 2007/0274099 A1* | 11/2007 | Tai | ............ | G02B 6/0038 362/610 |
| 2009/0045416 A1* | 2/2009 | Bierhuizen | ............ | H01L 33/46 257/88 |
| 2009/0066877 A1* | 3/2009 | Abe | ............ | G02B 6/0068 349/62 |
| 2010/0073597 A1* | 3/2010 | Bierhuizen | ............ | G02B 6/0021 349/62 |
| 2011/0194034 A1* | 8/2011 | Shimizu | ............ | G02B 6/0073 348/739 |
| 2015/0016132 A1* | 1/2015 | Verrat-Debailleul | ............ | B60Q 1/268 362/509 |
| 2016/0356941 A1* | 12/2016 | Ju | ............ | G02B 6/0023 |
| 2017/0139109 A1 | 5/2017 | Gierens et al. | | |
| 2017/0344188 A1* | 11/2017 | Nunokawa | ............ | G06F 3/0421 |
| 2019/0155105 A1* | 5/2019 | Aieta | ............ | G02B 6/0033 |

FOREIGN PATENT DOCUMENTS

| | | | | |
|---|---|---|---|---|
| JP | 2015-508359 A | 3/2015 | | |
| WO | WO-2007002476 A2 * | 1/2007 | .......... | G02B 6/0028 |
| WO | WO 2007/074318 A1 | 7/2007 | | |
| WO | WO 2010/035209 A1 | 4/2010 | | |
| WO | WO 2013/110885 A1 | 8/2013 | | |
| WO | WO 2014/131972 A1 | 9/2014 | | |
| WO | WO 2016/001508 A1 | 1/2016 | | |
| WO | WO 2016/001597 A1 | 1/2016 | | |

OTHER PUBLICATIONS

Notice of Reasons for Refusal as issued in Japanese Patent Application No. 2019-553346, dated Feb. 15, 2022.

* cited by examiner

ILLUMINATING GLAZING UNIT WITH THROUGH-HOLE FOR LIGHT INJECTION

CROSS-REFERENCE TO RELATED APPLICATIONS

This application is the U.S. National Stage of PCT/FR2018/050792, filed Mar. 30, 2018, which in turn claims priority to French patent application number 1752762 filed Mar. 31, 2017. The content of these applications are incorporated herein by reference in their entireties.

TECHNICAL FIELD OF THE INVENTION

The technical field of the invention is that of illuminating glazing units. The invention finds a particularly advantageous application in the creation of vehicle or building glazing units.

TECHNOLOGICAL BACKGROUND OF THE INVENTION

It is known practice to incorporate inorganic light-emitting diodes, also referred to as LEDs, into the edge of single- or laminated glazing units so that the light emitted by the diodes enters via the edge face of a sheet of glass and is guided thereby as far as a diffusing element, also referred to as a light extraction means.

These illuminating glazing units have an essentially ambient-lighting or luminous signaling function which is obtained using low-power diodes. The lighting efficiency of such edge-illuminated glazing units is generally limited because of the light losses caused by the absorption of the light by the glass acting as a waveguide and/or the materials in the close vicinity thereof.

It is also known practice, in particular from document WO 2013/110885, to drill a hole in the sheet of glass and fit the diodes therein. This hole is made near to the extraction means, in particular so as to shorten the optical path followed by the light between the diodes and the extraction means. In this way it is possible to reduce the losses associated with the absorption of the light.

The light emitted by the diodes is injected into the sheet of glass via an additional edge face formed by the hole. The light then bounces back and forth between the two main faces of the sheet of glass until it reaches the extraction means.

One disadvantage with this method is that the injection of light is not uniform.

Another disadvantage is the difficulty with mounting the diodes.

SUMMARY OF THE INVENTION

The present invention seeks to overcome at least one of the disadvantages which have just been mentioned.

According to the invention, this objective is achieved by providing an illuminating glazing unit comprising:
- a first transparent sheet of glass (for preference) or plastic (in particular rigid) drilled with a through-hole delimited by an internal wall; first sheet preferably comprising light extraction means (first sheet forming a light guide)
- at least one inorganic light-emitting diode comprising a light emission surface (emitting in a main direction of emission orthogonal or substantially orthogonal to the emission surface), preferably several inorganic light-emitting diodes; preferably a plurality of inorganic light-emitting diodes having an emission cone of at least 80°, comprising an emission surface emitting light in a main direction of emission substantially orthogonal to the emission surface, the glazing unit further comprising a light guide element made from a transparent dielectric material, the guide element (is one piece) comprising an input face arranged facing the emission surface (of the diode and, better, of several diodes), a body and an output face arranged facing the internal wall.

Within the context of the invention, the term "transparent" means that the transmission of light in the visible domain is greater than 50%. However, in applications in which visibility through the glazing unit is not a key factor, the transmission of light may be far lower, for example greater than 5%.

Throughout the description and in the claims, what is meant by "substantially orthogonal" is an angle comprised between 85° and 95°.

The guide element is an optical device through which light travels in a desired direction chiefly dependent on the shape of the guide element. Thanks to it, it is possible simultaneously to make the injection of light uniform, or even to limit the phenomenon of refraction within the sheet of glass by contriving for the rays of light to enter the sheet of glass at an angle of incidence that is high enough to allow total internal reflection of these rays off the main faces of the sheet of sheet of glass. The lighting efficiency of the glazing unit is thus improved.

The guide element allows greater freedom for example in the positioning at which the diode is mounted, which diode may be placed inside or outside the hole, and/or in the size of its emission surface, which may be larger than the thickness of the hole. In particular, the input face of the guide element, which is adapted to suit the emission surface of the diode or preferably diodes, is not necessarily equal in size to the output face (the height thereof) which is adapted to suit the internal wall of the hole (in particular the thickness thereof). In particular, the height (thickness) of the input face is not necessarily equal to the height (thickness) of the output face.

The guide element may be an optical fiber for one diode or even several diodes, or a collection of optical fibers, for example each one dedicated to one or more diodes. The fiber will give flexibility or allow the diode to be sited even more remotely if need be.

The guide element is preferably a monolithic component.

The guide element, if, for preference, a significantly extensive light input face is chosen, may easily allow the light to be carried from a great many diodes positioned facing this input face.

In the illuminating glazing unit of the present invention, a great many diodes for preference, for example at least three and preferably at least five and more preferably still at least ten diodes, are positioned facing the light input face (or faces) of the waveguide. The input face may be spaced away from the emission surface, in particular by at most 5 mm, and even by at most 1 mm, or is in optical contact via an adhesive or is in physical contact, and/or the output face may be spaced away from the internal wall in particular by at most 5 mm, and even by at most 1 mm, or is in optical contact via an adhesive or is in physical contact.

For preference, the guide element is not positioned against the first sheet of glass, and does not extend (or extends very little) facing the main face of the first sheet of glass.

The guide element used in the present invention is generally made up of a transparent organic glass, which means to say of a transparent organic polymer. This polymer may in theory be any thermoplastic or thermosetting polymer having a low linear absorption coefficient, preferably of less than 10-3 mm-1, and more preferentially of less than 10-4 mm-1.

By way of nonlimiting examples of organic polymers that may be suitable as material for the guide element, mention may be made of poly(methyl methacrylate) (PMMA), thermoplastic or thermosetting polycarbonates (PC), or even cyclo-olefin copolymers (COC).

Polycarbonate combines satisfactory transparency (88% transmission of visible light) with good thermal resistance (Tg 150° C.).

PMMA is the best choice because of its very high transparency. According to one embodiment, the illuminating glazing unit is a laminated glazing unit also comprising a second sheet of glass and a lamination interlayer placed between the first sheet preferably made of glass and the second sheet of glass.

It may be a curved laminated glazing unit.

The first sheet may be made of a plastic such as a polymethyl methacrylate PMMA, polycarbonate (PC), or even a poly(ethylene terephthalate) PET.

For preference, the first sheet is made of a colorless soda-lime glass such as clear glass or extra clear glass like Planiclear® marketed by the Applicant Company. In the case of a single-glazing unit, the first sheet preferably made of glass has a thickness preferably comprised between 2.5 mm and 6 mm. In the case of a laminated glazing unit, the thickness of the first sheet preferably made of glass is preferably comprised between 0.6 mm and 3.2 mm, and more preferably between 1.4 mm and 2.2 mm.

The second sheet may of course be as transparent and as colorless as the first sheet. According to one particular embodiment, a laminated glazing unit according to the invention is made up of two colorless Planiclear® sheets.

According to another embodiment, the second sheet is made of tinted glass, for example of tinted glass in particular having a light absorption of greater than 10%, such as Venus®, TSA3+ or TSA4+, also marketed by the Applicant Company. The second sheet has a thickness preferably comprised between 1.4 mm and 2.1 mm.

For preference, the lamination interlayer comprises at least one thermoplastic material, preferably poly(vinyl butyral) (PVB), ethylene vinyl acetate (EVA) and/or poly(ethylene terephthalate) (PET). The lamination interlayer may also for example contain polyurethane (PU), polypropylene (PP), polyacrylate, polyethylene (PE), polycarbonate (PC), poly(methyl methacrylate) (PMMA), poly(vinyl chloride) (PVC), a polyacetal resin, casting resins, acrylates, fluorinated ethylene propylene (FEP), poly(vinyl fluoride) (PVF), and/or ethylene tetrafluoroethylene (ETFE) or copolymers mixtures of these. The lamination interlayer has a thickness preferably comprised between 0.2 mm and 1.1 mm. For preference, the lamination interlayer is transparent. The lamination interlayer may be colorless or tinted. The PVB may be acoustic and/or tinted. The lamination interlayer may contain at least one thermoplastic material such as PVB or EVA and a transparent polymer sheet for example made of PET, in particular covering the surface of the glazing unit, for example at least 90% of the surface. This polymer sheet may be coated with a, preferably transparent, electrically conducting coating, for example for controlling sunlight or for powering one or more (opto)electronic components. For example, it is a PVB/coated polymer sheet/PVB and in particular a PVB/coated PET/PVB assembly.

The output face of the guide element may face a first zone of the internal wall:
which is local
or more extensive, for example which covers the entire perimeter of the internal wall particularly with several diodes facing the input face of the guide element.

The output face of the guide element may thus extend along the internal wall of the through-hole (over at least 50% or even at least 80% of the internal wall), possibly with a closed cross section, and be shared in common by several inorganic light-emitting diodes; in particular the internal wall is curved and the guide element is curved.

According to a preferred embodiment, the through-hole has a curved, for example circular, shape. The guide element may follow the shape of the hole, for example curved, and in addition have a closed cross section, for example in this instance an annular overall shape, or an open cross section, for example in this instance a portion of an annulus.

Alternatively, the through-hole may be rectangular or oblong. The guide element may follow the shape of the hole, and have a closed cross section, for example in this instance the overall shape of a frame.

The through-hole has a closed cross section, which means to say that it is completely surrounded by the internal wall. The through-hole is not a notch positioned at the periphery of the glazing unit but rather is spaced away from the periphery of the glazing unit. This is because the periphery of the glazing unit is generally equipped with encapsulation means or with a profiled bead of adhesive, either of which is of assistance in attaching the glazing unit, but which could hamper the fitting of the diodes.

The through-hole is preferably large enough to be able to house several inorganic light-emitting diodes therein. However, the hole preferably does not exceed a certain size beyond which there is a risk that the robustness of the glazing unit may become significantly reduced. The through-hole has a surface area preferably of less than 50 cm$^2$ and even than 10 cm$^2$, and more preferably still comprised between 0.5 cm$^2$ and 5 cm$^2$.

The diode or diodes may be top-emitting LEDs or side-emitting LEDs.

The diode or diodes are preferably on a diode carrier such as an electronic circuit board, for example a printed circuit board (PCB).

The diode carrier is preferably common to several diodes. The diode carrier may be opaque, for example being covered with a layer of lacquer or of paint, and may even conceal the diodes. It may comprise a substrate made of a plastic.

According to one embodiment, the lamination interlayer or the second sheet of glass forms a bottom for the through-hole.

The diode carrier with side-emitting diodes may follow the overall shape of the hole and have one main face fixed to the bottom of the through-hole, directly or indirectly, for example via a mounting carrier. The diode carrier common to several side-emitting diodes may be a disk (or may be oblong) or a ring in the circular (or oblong) hole.

The diode carrier with top-emitting diodes may follow the shape of the internal wall and even have a closed cross section. The diode carrier common to several top-emitting diodes may be a flexible strip, in particular in the form of an annulus ring or annulus portion, of rectangular overall shape. The front main face of the diode carrier bearing the diodes faces the internal wall. The rear main face of the diode carrier is, for example, fixed against a lug of a cover that closes the through-hole or of a mounting carrier assembled in the bottom of the through-hole.

The guide element also comprises external walls which, with the input face and the output face, delimit the body of the guide element. The external walls guide the light and some of them may constitute faces off which the light is reflected. The external walls are preferably very smooth surfaces, the absence of roughness making it possible to avoid or, at the very least, reduce the loss of luminosity caused by scattering of the light.

What is meant by a "reflection face" is an external wall of the guide element which performs alight-deflecting function. The reflection face may deflect the light through at least 80°, even at 90° and better still through at least 170° or even at 180°.

This reflection face may either comprise at least one curved part or it may comprise a collection of facets. When it comprises two facets, this reflection face operates in the manner of a periscope. The number of facets of which the reflection face is composed is, in theory, unlimited, and combining a great many facets works, in the known way, like a curved face.

When the reflection face comprises a curved face or is a curved face, the radius of curvature defining this curved face is preferably constant and then for example defines a quarter of a circle or a semicircle.

The body of the guide element is, in particular, spaced away from the bottom of the through-hole and possibly fixed to the bottom of the hole, for example by bonding or by means of a double-sided adhesive element.

Alternatively, the body of the guide element may be in contact with the bottom of the through-hole.

In particular, there may be zones (strips, pads) for bonding together the body and the bottom and which are offset from the main direction of emission of each diode or, where possible, offset from the emission cone of each diode.

These bonding zones may be provided between adjacent diodes, between each diode.

In order to firmly attach the guide element to the bottom of the through-hole without, however, increasing light losses, a layer having a low refractive index may be inserted between the bottom of the hole and the guide element.

The expression "having a low refractive index" refers to a layer of an organic or inorganic material having a refractive index at least 0.1 of a unit lower than the refractive index of the material that forms the guide element with which it is in contact. The difference in refractive index is preferably at least equal to 0.2 of a unit and more preferably still at least equal to 0.3 of a unit.

This layer of low refractive index may, for example, be a layer of adhesive having a low refractive index.

The thickness of the layer of low refractive index is preferably at least equal to 1 micron, more preferably at least equal to 5 microns.

The layer of low refractive index is advantageously a layer of air. Specifically, air has a refractive index equal to 1, which means to say that is lower than that of solid materials.

When the layer of low refractive index is a layer of air, use is advantageously made of spacers, in order to maintain a certain distance between the two surfaces (bottom of the hole and guide element) and thus ensure a sufficient thickness of the layer of air, preferably at least equal to 10 microns, more preferably comprised between 50 and 500 microns, and ideally of between 100 and 300 microns.

It is also conceivable to attach the guide element by bonding using multiple spots or multiple lines of adhesive.

According to one embodiment, the body of the guide element comprises a reflective external coating applied at the interface between the body of the guide element and the bottom of the through-hole. This coating makes it possible to prevent light from the diodes from being visible from the other side of the glazing unit. In particular, the body of the guide element is delimited by external walls provided with a reflective coating, for example a metallic layer such as of aluminum or of silver.

The through-hole may, for example, comprise an opaque (in particular absorbent) element and at least part of the transparent body of the guide element is spaced away from said opaque element. In particular, there may be zones (strips, pads) for bonding together the body and the opaque element and which are offset from the main direction of each diode or, where possible, offset from the emission cone of each diode. These bonding zones may be provided between adjacent diodes, between each diode.

According to one embodiment, the through-hole has a first characteristic dimension in a reference direction, the body of the guide element being assembled on a mounting carrier that has a second characteristic dimension in the reference direction that is smaller than the first characteristic dimension, the mounting carrier being placed on the lamination interlayer or on the second sheet of glass.

The characteristic dimensions are, for example, diameters in the case where circular shapes are used, or alternatively represent a width or a length in the case of rectangular or elongate shapes.

According to one embodiment, the mounting carrier is reflective, the guide element being assembled for example by bonding, or the mounting carrier is opaque (in particular absorbent) and, when the body has a transparent free external wall, part (the most part) of the body facing the mounting carrier is spaced away from the mounting carrier.

What is meant by "free external wall" is an external wall of the guide element that has no reflective coating.

According to one embodiment, the light-emitting diode or diodes are arranged outside of the through-hole. One advantage to the remote-siting of the diode or diodes is that of achieving better thermal management since the diodes are able to enjoy more space in which to dissipate the heat that they generate. Another advantage is that of being able to reduce the size of the through-hole and thus minimize the impact that this hole has, in particular on the robustness of the glazing unit. Yet another advantage is that of being able to use all types of diodes without being restricted by the space available in the through-hole.

According to one embodiment, the inorganic light-emitting diodes are arranged on the first sheet at the periphery of the through-hole. In particular, the diode carrier bearing side-emitting diode(s) is placed on the first sheet of glass at the periphery of the through-hole.

According to one embodiment, the glazing unit comprises a cover closing the through-hole, the cover delimiting a cavity enveloping the through-hole. One advantage is that of enlarging the space available in which to site the diodes and/or the guide element.

In particular, said light-emitting diode is placed inside the cavity, preferably in the through-hole.

The cover may be transparent or opaque (absorbent) and, when the body has a transparent free external wall, part (the most part) of the body facing the cover is spaced away from the opaque cover.

According to one embodiment, the cover comprises an interior face internal to the cavity, said light-emitting diode being positioned on the interior face of the cover, for example against or bonded to this interior face. In particular, the diode carrier bearing the diode(s) is placed on the interior face of the cover.

According to one embodiment, the cover is removable, the cover being fixed to the first sheet of glass by reversible means of attachment, such as screws or fasteners of the clip type.

Alternatively, the cover may be bonded to the first sheet of glass.

According to one embodiment, the first sheet is drilled with a plurality of through-holes, the guide element comprising a plurality of output faces, each output face being positioned facing the internal wall of one of the through-holes, in particular bonded using an optical adhesive, or spaced away from said internal wall. This configuration makes it possible to use a single light source for several injection points, thereby reducing costs.

According to one embodiment, the guide element is assembled to the first sheet by bonding.

According to one embodiment, the bonding of the guide element is performed at the interface between the internal wall of the through-hole and the output face of the guide element by means of an optical adhesive, for example of the UV-cured urethane acrylic type.

According to one embodiment, the diodes are powered with electricity by means of a current supply incorporated into the laminated glazing unit. For example, an electric wire may be incorporated into the lamination interlayer.

The glazing unit according to the invention may comprise light extraction means for extraction of the light guided in the first sheet (coming from said diode or diodes), —which are removable (sticker etc.) and/or permanent—in particular chosen from a diffusing layer (for example based on enamel or even on paint etc.) facing or even on one of the main faces of the first sheet or a texturing of one of the main faces of the first sheet (sand-blasting, acid-etching, etc.) or alternatively diffusing elements in the first sheet produced in particular by laser etching.

BRIEF DESCRIPTION OF THE FIGURES

The invention and its various applications will be better understood from reading the following description and from studying the accompanying figures among which:

FIG. 6 schematically depicts a sixth embodiment of an illuminating glazing unit according to the invention;

Figure 1A:
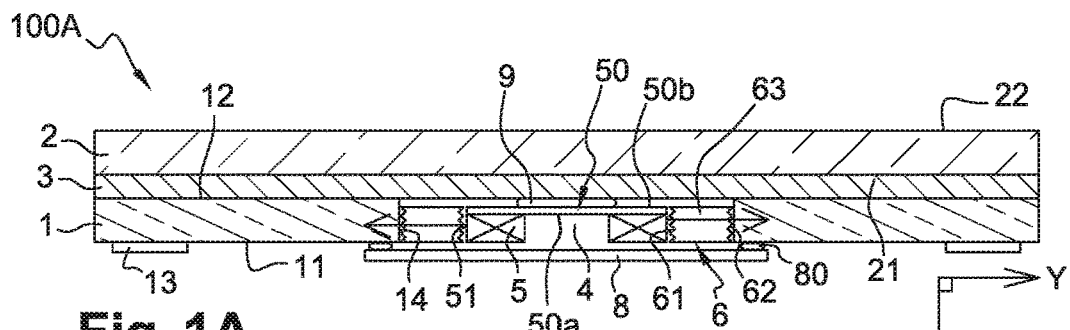
FIGS. 1A and 1B schematically depict a first embodiment of an illuminating glazing unit according to the invention, in cross section and in plan view, respectively.

The figures are given merely by way of indication and do not in any way limit the invention.

For greater clarity, elements that are identical or similar are identified by identical reference signs in all the figures.

DETAILED DESCRIPTION OF ONE EMBODIMENT OF THE INVENTION

A number of embodiments of an illuminating glazing unit according to the invention will now be described with reference to FIGS. 1 to 15. According to some embodiments, the illuminating glazing unit is a laminated glazing unit particularly configured to form a window of a vehicle (in particular a road vehicle), such as a roof, a side window or a windshield. According to other embodiments, the illuminating glazing unit is a single-glazing unit, which means to say that the glazing unit comprises just one single sheet of glass.

The, preferably curved, laminated glazing unit comprises a first, transparent, curved sheet of glass 1 and a second curved sheet of glass 2, preferably likewise transparent and potentially tinted, which are joined to one another by means of a lamination interlayer 3 placed between the sheets 1, 2. The sheets 1, 2 each comprise a first main surface 11, 21, intended to face toward the inside of the vehicle, and a second main surface 12, 22, intended to face toward the outside of the vehicle.

The lamination interlayer 3 is, for example, placed in adhesive contact with the second main surface 12 of the first sheet 1 and with the first main surface 21 of the second sheet 2. For preference, the lamination interlayer 3 is likewise transparent, preferably made of PVB, which may be tinted and/or acoustic. The lamination interlayer may comprise a transparent polymer sheet for example made of PET, in particular covering the surface, for example at least 90%. This sheet may be coated with a transparent electrically conducting coating, for example for controlling sunlight. For example, it is a PVB/sheet/PVB and in particular a PVB/PET/PVB assembly.

The first sheet 1 is pierced with a through-hole 4 extending in a first direction X substantially orthogonal to the main surfaces 11, 12 of the first sheet 1. The first direction X corresponds also to the direction of stacking of the various layers of which the laminated glazing unit is made. In order to facilitate spatial orientation in the remainder of the description, a second direction Y substantially orthogonal to the first direction X is defined.

For preference, the through-hole 4 has a circular shape which is the simplest shape to produce.

The through-hole 4 preferably extends only through the first sheet 1. The second sheet 2 and the lamination interlayer 3 are therefore not pierced. The through-hole 4 opens both onto the first main surface 11 and onto the second main surface 12 of the first sheet 1. The through-hole 4 forms an internal wall 14 in the first sheet 1.

Alternatively, the laminated glazing unit may be pierced right through, the through-hole 4 then extending through the first sheet of glass 1, the lamination interlayer 3 and the second sheet of glass 2. In that case, the through-hole 4 made in the second sheet of glass 2 may be filled with a blocking element so as to make the glazing unit fluidtight.

The glazing unit according to the invention comprises one or more inorganic light-emitting diodes (LEDs) 5. Each diode 5 comprises an emission surface 51 emitting in a main direction of emission substantially orthogonal to the emission surface 51. The diodes 5 all have an emission cone at least equal to 80°.

The emission surface 51 may be positioned on one side of the diode 5, which is then said to be "side-emitting", or on a main surface of the diode 5, which is then said to be "top-emitting". Such diodes are respectively referred to in English using the terminology "side-emitting LED" and "top-emitting LED". Side-emitting diodes have the advantage of being smaller in bulk than top-emitting diodes. By contrast, top-emitting diodes are more powerful and less expensive than side-emitting diodes.

The diodes 5 are mounted on a diode carrier 50 such as an integrated circuit board (or PCB). The carrier 50 is preferably common to all the diodes 5. Alternatively, each diode 5 may be placed on an individual carrier, or several diodes 5 may be mounted on the one same carrier.

The carrier 50 comprises a front main face 50a bearing the diodes 5, and a rear main face 50b on the opposite side to the front face 50a. The mounting carrier has a thickness preferably of less than 500 μm, and more preferably of less than 200 μm.

In the embodiments illustrated in FIGS. 1 to 5, the diodes 5 are side-emitting LEDs.

In the embodiments illustrated in FIGS. 6 to 15, the diodes 5 are top-emitting LEDs.

The glazing unit according to the invention also comprises a guide element 6 for guiding the light emitted by the diodes 5. The guide element 6 is configured to inject the light from the diodes 5 into the first sheet 1 via the internal wall 14 formed by the through-hole 4. The guide element 6 comprises an input face 61 and an output face 62 as well as a body 63 delimited by the input face 61, the output face 62 and external walls.

The diodes 5 are arranged in such a way that their emission surfaces 51 face, and are in close proximity to, the input face 61 of the guide element 6, spaced away or in contact. The emission surface 51 of each diode 5 and the input face 61 of the guide element 6 are spaced apart by at most 1 mm, preferably by at most 5 mm, spaced away or even in contact, for example in optical contact (via an adhesive) or in physical contact.

What is meant by "optical contact" is two shaped surfaces in contact with each other or alternatively two surfaces which are connected by a transparent adhesive (referred to as an index adhesive).

The emission surface 51 of each diode 5 is preferably substantially parallel to the input face 61 of the guide element 6.

Throughout the description and in the claims, what is meant by "substantially parallel" is an angle comprised between −5° and 5°.

The guide element 6 is arranged in such a way that its output face 62 faces, and is in close proximity to, the internal wall 14, spaced away or in contact. The output face 61 of the guide element 6 may be spaced away from the internal wall by at most 5 mm, preferably by at most 1 mm, spaced away or even in contact, for example in optical contact (via an adhesive) or in physical contact. The light emitted by the diodes 5 travels through the body 63 of the guide element 6 between the input face 61 and the output face 62. Advantageously, this travel is via total internal reflection off the walls of the guide element 6, thereby making it possible to maximize the lighting efficiency of the glazing unit.

The guide element 6 is used to optimize the injection of light into the first sheet 1. It makes it possible to improve the uniformity of the lighting of the first sheet 1. The guide element 6 may exhibit a wide variety of shapes, so as to suit the various configurations of diode type and positioning, as described in greater detail later on.

Across all of the figures, the arrows indicate the direction in which light emitted by the diodes 5 travels. The arrow emanating from the emission surface 51 of a diode 5 also symbolizes the main direction of emission of this diode 5.

The light injected through the internal wall 14 is guided by the first sheet 1 as far as a light extraction means 13. This is, for example, a pale-colored opaque enamel applied to the second main surface 12 of the first sheet 1.

FIG. 1A is a view in cross section of a first embodiment of a glazing unit 100A according to the invention, in which the guide element 6 has an annular shape with a substantially rectangular longitudinal section. The input face 61 and the output face 62 of the guide element 6 are substantially parallel. The output face 62 of the guide element 6 follows the internal wall 14 of the through-hole 4. The input face 61 of the guide element 6 delimits an empty space inside the through-hole 4. The side-emitting diodes 5 are arranged in the empty space with their emission surface 51 facing the input surface 61 of the guide element 6. In this first embodiment, the diodes 5 emit light in the second direction Y.

Figure 16A:
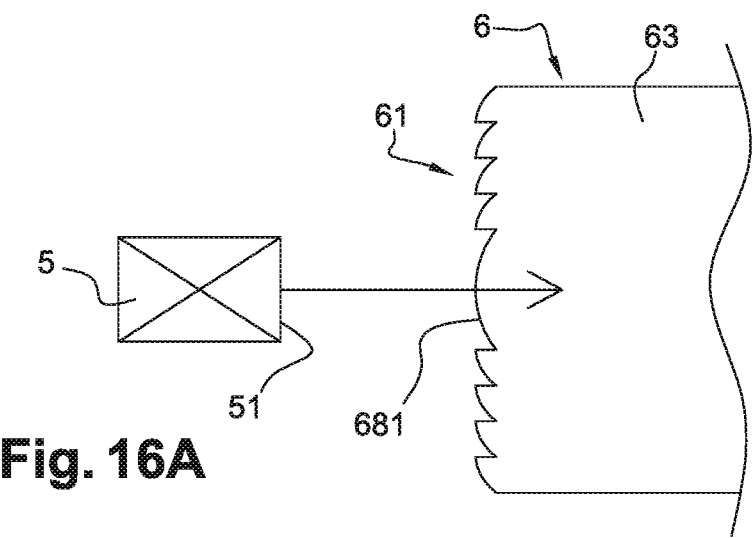
FIGS. 16A to 16E schematically depict examples of light redirection means with which an input face of a light guide element of any one of the embodiments of FIGS. 1 to 15 is equipped.
Figure 16B:
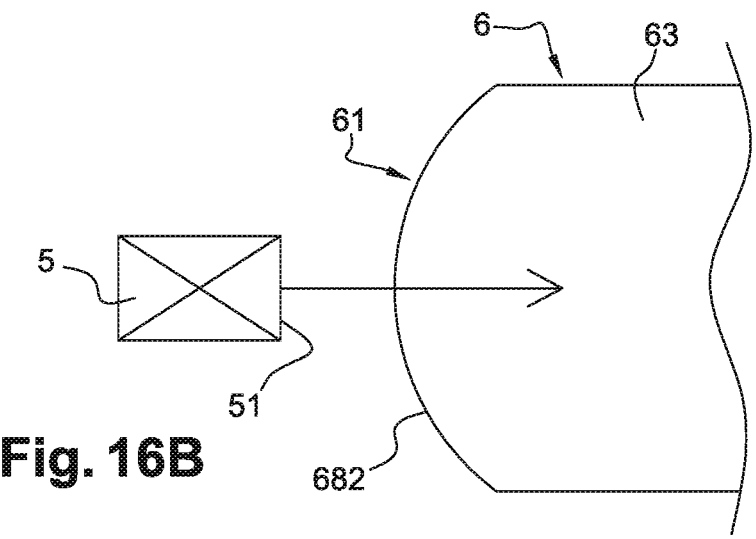
Figure 16C:
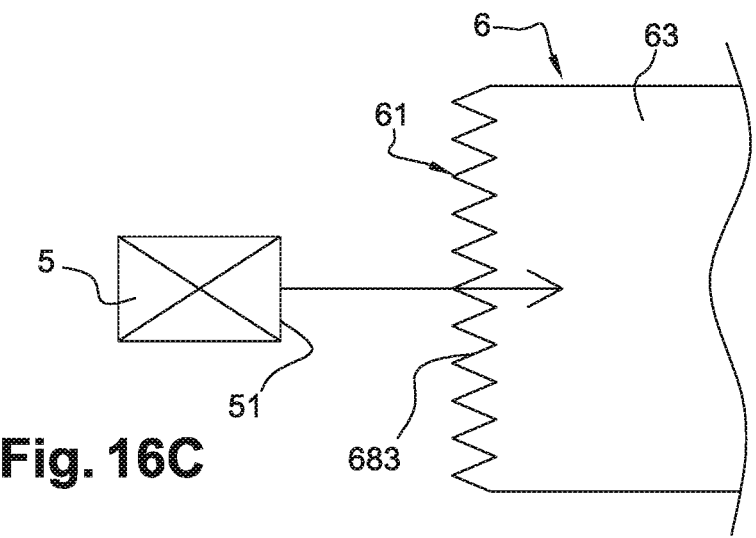
Figure 16D:
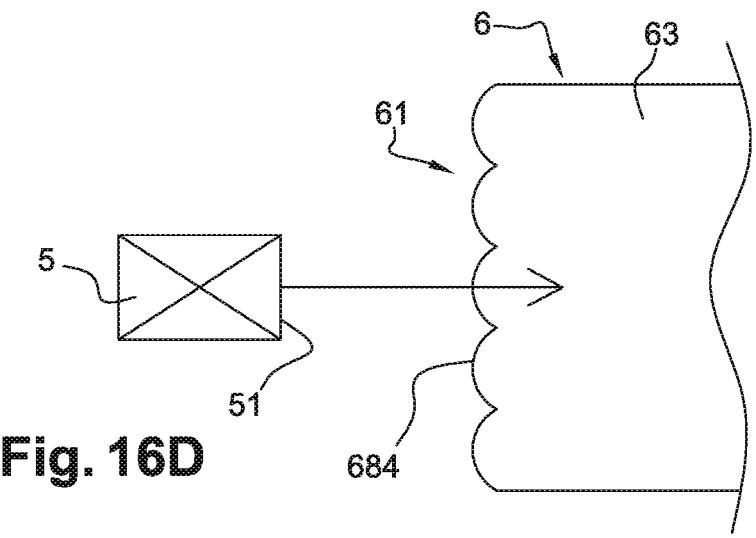
Figure 16E:
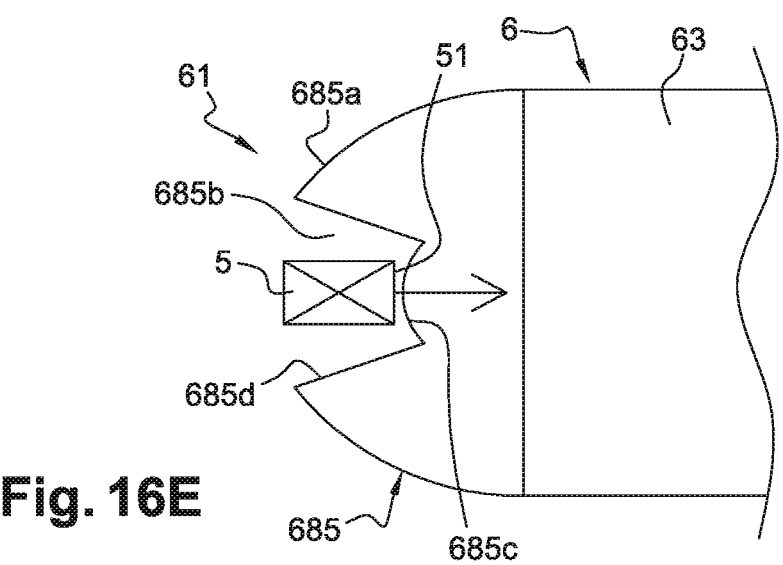

For preference, the input face 61 of the guide element is non-planar and in particular is bonded to or in non-optical contact with the diode or diodes, in particular is in physical contact therewith or spaced away therefrom. The input face 61 may be provided with light redirection means 68, for example arranged facing the emission surface 51 of each diode 5. The redirection means may be Fresnel lenses 681 as illustrated in FIG. 16A, convex lenses 682 as illustrated in FIG. 16B, gratings 683 as illustrated in FIG. 16C, arrays of convex micro lenses 684 as illustrated in FIG. 16D, or collimation means 685 as illustrated in FIG. 16E.

The collimation means 685 have, for example, an ogive overall shape delimited by a peripheral surface 685a and hollowed by a cavity 685b of circular cross section, the peripheral surface 685a and the cavity 685b being concentric. The cavity 685b may be formed by a convex lens 685c and a frustoconical wall 685d extending longitudinally from the edge of the convex lens 685c until it opens onto the peripheral surface 685a. The frustoconical wall 685d has a diameter that becomes larger with increasing distance away from the convex lens 685c. The emission surface 51 of a diode 5 may be situated inside or outside the cavity 685b.

The output face 62 of the guide element 6 may also be non-planar. The output face 62 may be provided with light redirection means such as those previously described with reference to FIGS. 16A to 16E. The redirection means of the input face 61 and of the output face 62 may be identical or different.

For preference, the redirection means form an integral part of the body 63 of the guide element 6. Alternatively, the redirection means are attached to the body 63 of the guide element 6 by optical bonding.

Figure 1B:
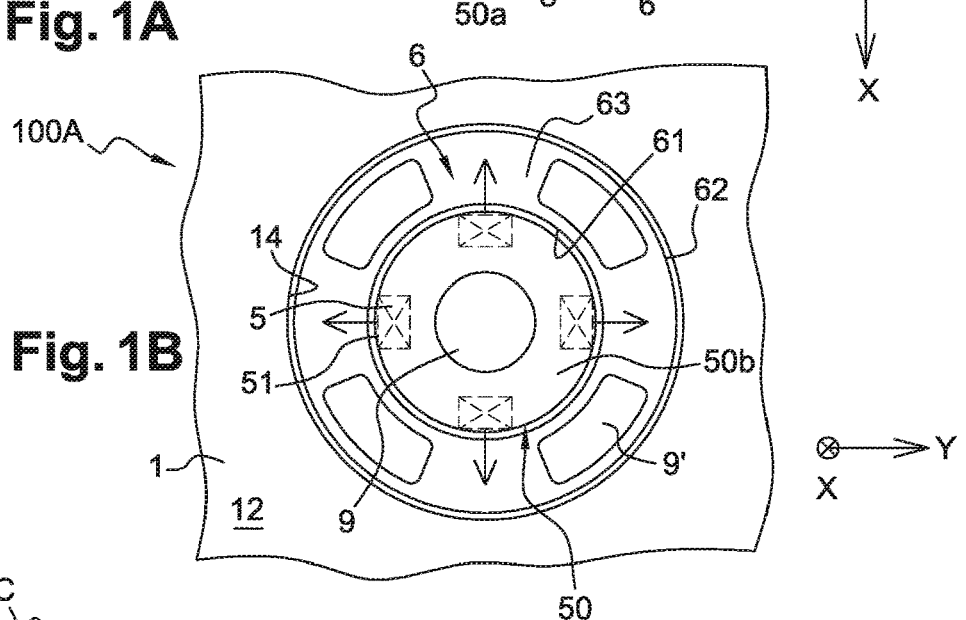

FIG. 1B is a plan view of the glazing unit 100 of FIG. 1A considered at the interface between the first sheet of glass 1 and the lamination interlayer 3. The diode carrier 50 has, for example, the shape of a solid disk. Alternatively, the carrier 50 may have the shape of an annulus.

In this first embodiment, the guide element 6 and the carrier 50 are attached to the lamination interlayer 3, at the bottom of the through-hole 4, for example by means of an adhesive applied to respective bonding zones 9, 9'. The bonding zone 9 of the carrier 50 is, for example, situated at the center of the rear face 50b thereof. The bonding zones 9' of the guide element 6 are, for example, located in such a way as to be situated away from the emission cones of the diodes 5. The bonding zones 9, 9' each have a thickness preferably of less than 500 μm, and more preferably of less than 200 μm.

Alternatively, the guide element 6 and the carrier 50 may each be secured by means of a double-sided adhesive element.

The guide element 6 may also or alternatively be held in position in the through-hole 4 by bonding at the interface between the internal wall 14 of the through-hole 4 and the output face 62 of the guide element 6. In that case, an optical adhesive is advantageously used. The optical adhesive is a high-cure adhesive which makes it possible to achieve optical continuity between the guide element 6 and the first sheet 1 in order not to disrupt the injection of light.

For preference, the through-hole 4 is closed by a cover 8 which may be opaque or transparent. In this embodiment, the cover 8 has the overall shape of a disk bonded to the first main surface 11, for example by means of a bead of adhesive 80 applied to the periphery of an interior face 81 of the cover.

Figure 1C:
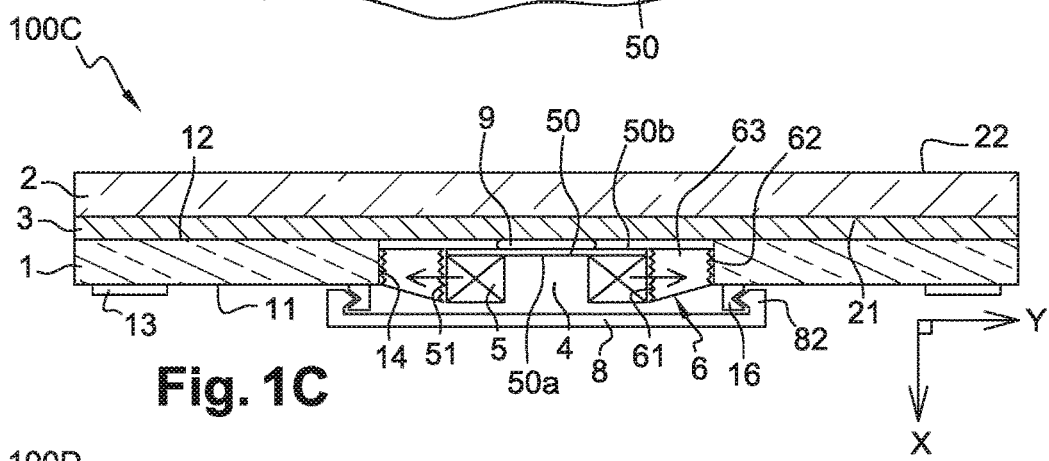
FIGS. 1C and 1D respectively schematically depict a first and a second alternative form of the glazing unit of FIG. 1A.

FIG. 1C shows a glazing unit 100C according to a first alternative form of the first embodiment. The input face 61 and the output face 62 of the guide element 6 respectively have an input height h1 and an output height h2 in the first direction X. In this glazing unit 100C, the input height h1 is greater than the output height h2. As a result, the longitudinal external walls of the guide element 6 are not parallel.

In this alternative form, the cover 8 that closes the through-hole 4 comprises a rim 82 configured to form a cavity which contains the through-hole 4. This configuration makes it possible to provide more space than is offered by the through-hole 4 alone, in which to position the diodes 5 and the guide element 6. The diodes 5 are arranged here inside the cavity, for example on an interior face 81 of the cover 8. The cover 8 is preferably opaque.

The cover 8 may be removable. The cover 8 is, for example, attached to the first main face 11 of the first sheet 1 using fasteners 16, for example of the clip type, collaborating with the rim 82 of the cover 8. The cover 8 can thus be removed in order to access the through-hole 4.

Figure 1D:
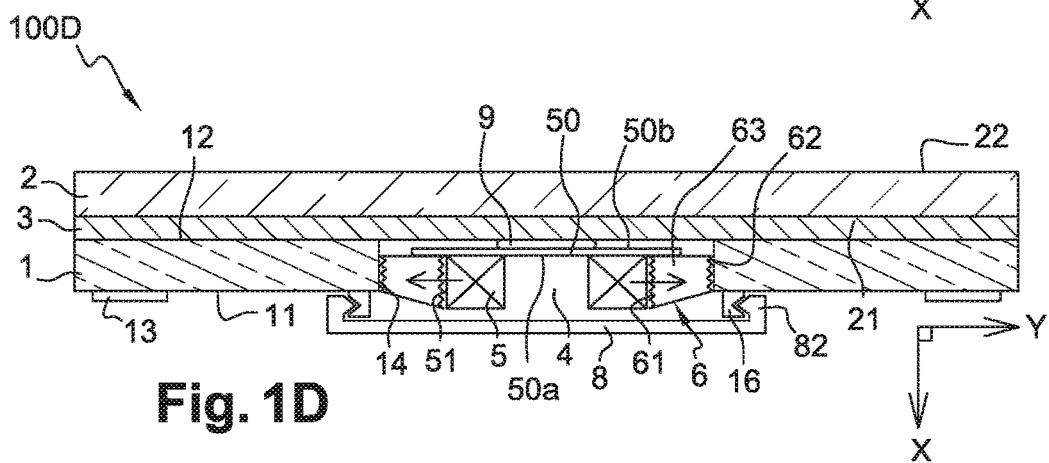

FIG. 1D shows a glazing unit 100D according to a second alternative form of the first embodiment. In this alternative form, the guide element 6 is fixed at the periphery of the diode carrier 50, for example by bonding.

Figure 2:
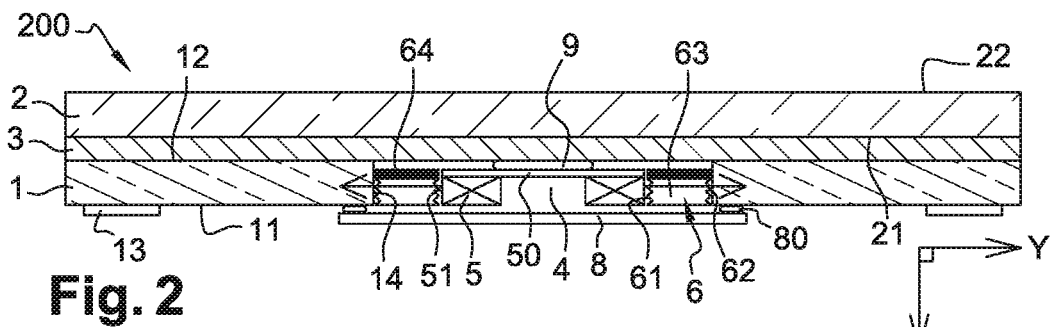
FIG. 2 schematically depicts a second embodiment of an illuminating glazing unit according to the invention.

FIG. 2 shows a glazing unit 200 according to a second embodiment similar to the embodiment of FIG. 1A but in which the external wall of the guide element 6 arranged between the lamination interlayer 3 and the guide element 6 is covered with a reflective layer 64. The reflective layer 64 is produced for example by depositing a layer of the silvering type on the guide element 6. The reflective layer 64 makes it possible to prevent light from being visible from the other side of the glazing unit, in this instance from the exterior of the vehicle. This is what is referred to as a "hotspot". More broadly speaking, all the external walls of the body 63 other than the input face 61 and the output face 62 may be coated with a reflective layer.

Figure 3:
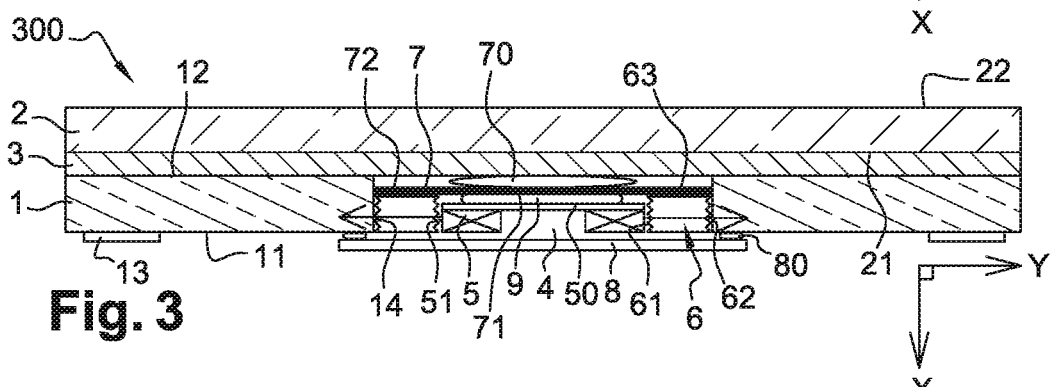
FIG. 3 schematically depicts a third embodiment of an illuminating glazing unit according to the invention.

FIG. 3 shows a third embodiment of a glazing unit 300 comprising a mounting carrier 7 distinct from the diode carrier 50. The mounting carrier 7 has, for example, the shape of a disk having a diameter smaller than that of the through-hole 4. The mounting carrier 7 comprises a first main surface 71 having the same orientation as the first main surface 11 of the first sheet of glass 1, and a second main surface 72 on the opposite side to the first main surface 71.

In this embodiment, the annular guide element 6 is fixed beforehand to the first main surface 71 of the mounting carrier 7, for example using the adhesive 9, then the mounting carrier 7 is fixed to the lamination interlayer 3, for example by means of an adhesive 70. In order to prevent a hotspot from appearing, the mounting carrier 7 is advantageously reflective.

Figure 4:
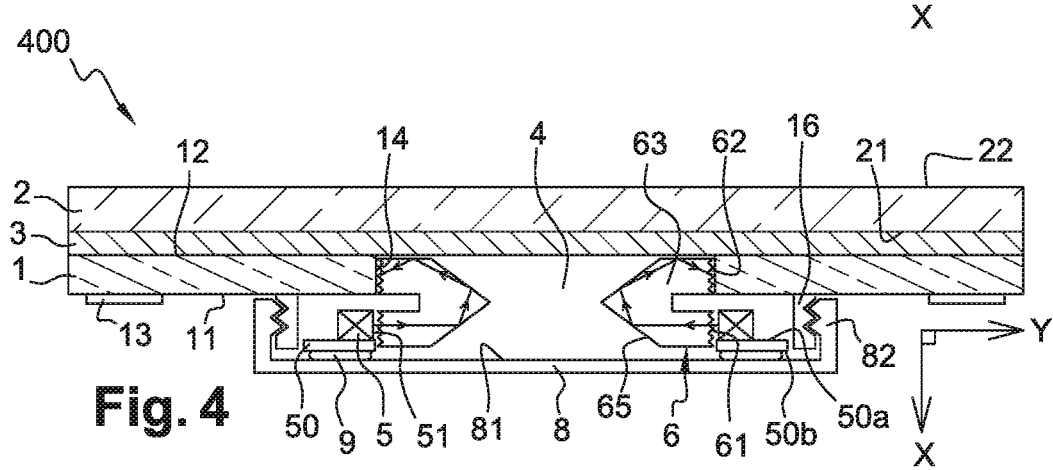
FIG. 4 schematically depicts a fourth embodiment of an illuminating glazing unit according to the invention.

FIG. 4 shows a fourth embodiment of a glazing unit 400 in which the diodes 5 are arranged outside the through-hole 4 rather than inside it. The diodes 5 are, for example, placed on the first sheet 1 at the periphery of the through-hole 4. For example, the emission surface 51 of the diodes 5 lies flush with the internal wall 14 formed by the through-hole 4.

In this embodiment, the guide element 6 also has an annular overall shape but its input face 61 and its output face 62 lie on the one same side of the guide element 6. The guide element 6 is configured to reflect light at 180°, for example by means of two chamfered external walls 65 arranged on the opposite side to the input 61 and output 62 faces. The chamfered external walls 65 each form an angle of preferably between 40° and 50° with the first direction X.

The diode carrier 50 has, for example, an annular shape with an inside diameter greater than the outside diameter of the guide element 6. The diode carrier 50 is, for example, bonded to the interior face 81 of the cover 8 but could alternatively be bonded to the first main surface 11 of the first sheet of glass 1.

The guide element 6 may just as well be fixed to the interior face 81 of the cover 8 as to the lamination interlayer 3.

Figure 5:
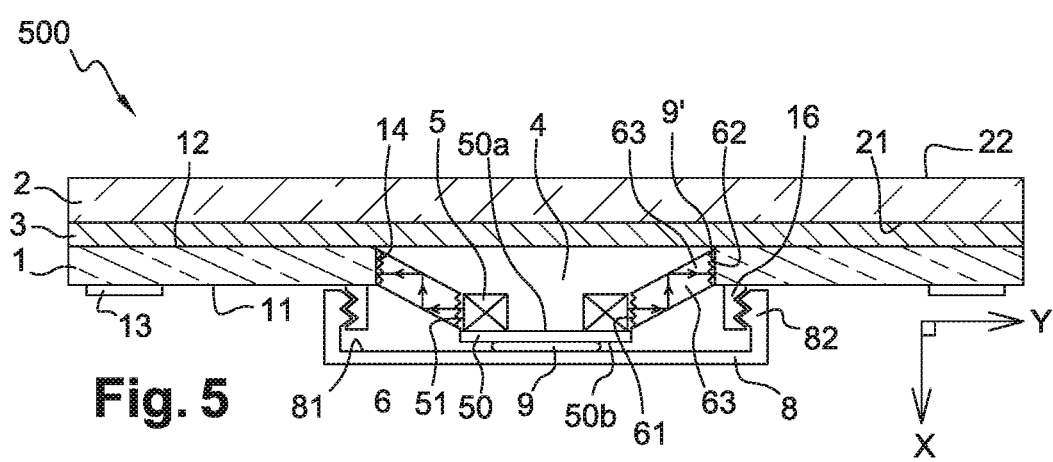
FIG. 5 schematically depicts a fifth embodiment of an illuminating glazing unit according to the invention.

FIG. 5 shows a fifth embodiment of a glazing unit 500 in which the guide element 6 has a frustoconical shape with a substantially parallelepipedal longitudinal section. In this configuration, the external walls of the guide element 6 cannot be attached to the lamination interlayer 3 or to the cover 8. The bonding zone 9' of the guide element 6 is advantageously situated at the interface between the output face 62 and the internal wall 14 of the first sheet of glass 1. In this case, the bonding is preferably an optical bonding.

Figure 6A:
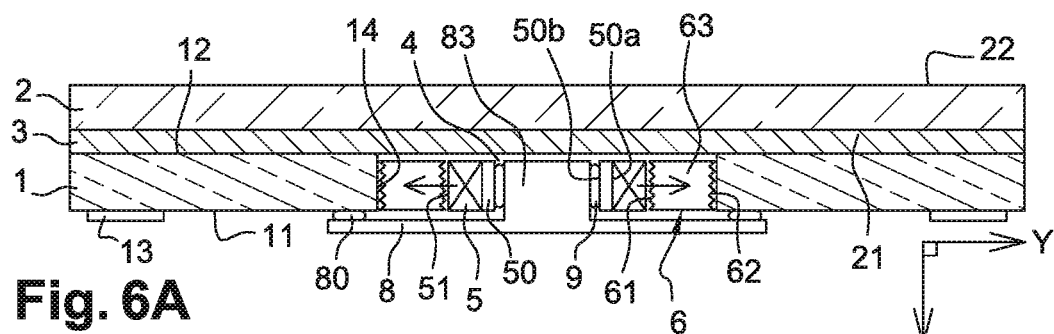
FIGS. 6A and 6B schematically depict a sixth embodiment of an illuminating glazing unit according to the invention, in cross section and in plan view, respectively.
Figure 7:
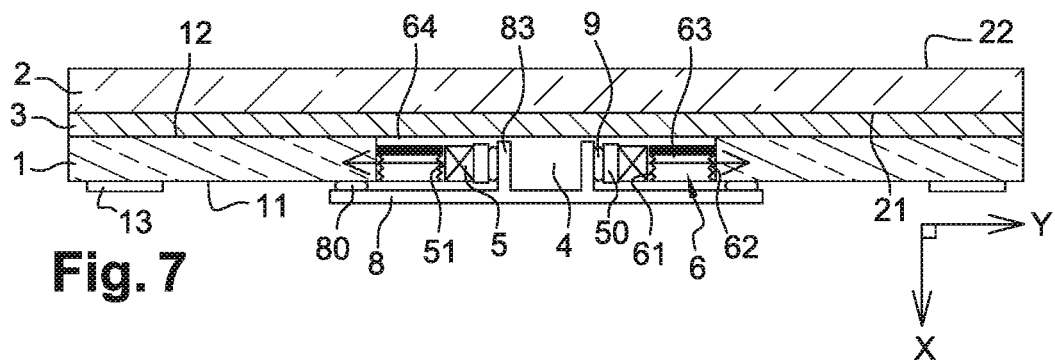
FIG. 7 schematically depicts a seventh embodiment of an illuminating glazing unit according to the invention.
Figure 8A:
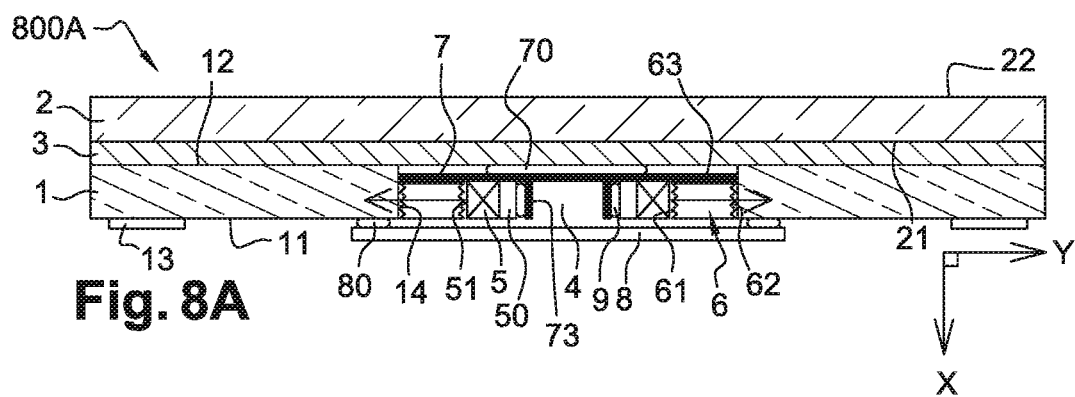
FIG. 8A schematically depicts an eighth embodiment of an illuminating glazing unit according to the invention.

FIGS. 6A, 7 and 8A show glazing units 600A, 700, 800A according to sixth, seventh and eighth embodiments respectively similar to the embodiments of FIGS. 1A, 2 and 3 but which nevertheless differ therefrom in that the diodes 5 are top-emitting LEDs. The diodes 5 are turned at 90° so that their emission surface 51 still faces the input face 61 of the guide element 6.

Figure 6B:
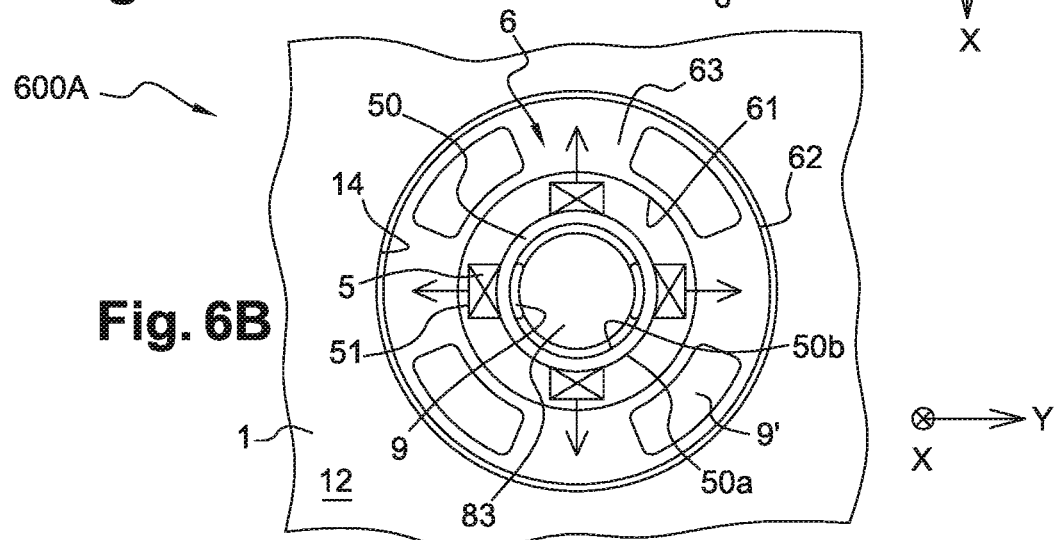

In these embodiments, the diode carrier 50 is flexible and is positioned in the through-hole 4 in such a way as to form an annulus, as illustrated in FIG. 6B. Advantageously, the diode carrier 50 is attached to a lug 83 belonging to the cover 8 in the embodiments of FIGS. 6A and 7, or to a lug 73 belonging to the mounting carrier 7 in the embodiment of FIG. 8A. In a similar way to instances in which the mounting carrier 50 is attached to the bottom of the through-hole 4, the carrier 50 may be attached to the lug 73, 83 by means of an adhesive applied to bonding zones 9.

In the embodiment of FIG. 6A, the lug 83 extends as a projection from the interior face 81 of the cover 8 in the first direction X. The lug 83 has, for example, a cylindrical shape.

In the embodiment of FIG. 8A, the lug 73 extends as a projection from the first main surface 71 of the mounting carrier 7. The lug 73 for example has an annular shape.

Other shapes of lug are of course conceivable, such as an oblong shape. The lug may also be made up of several annulus portions rather than having a closed cross section.

Figure 6C:
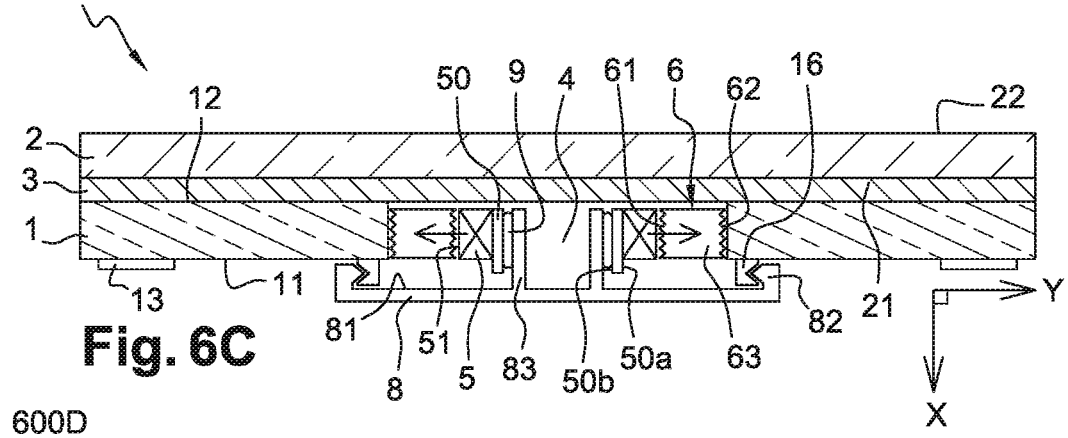
FIGS. 6C and 6D respectively schematically depict a first and a second alternative form of the glazing unit of FIG. 6A.

FIG. 6C shows a glazing unit 600C according to a first alternative form of the sixth embodiment. In this alternative form, the lug 83 has an annular shape, similar to the embodiment of FIG. 7.

Figure 6D:
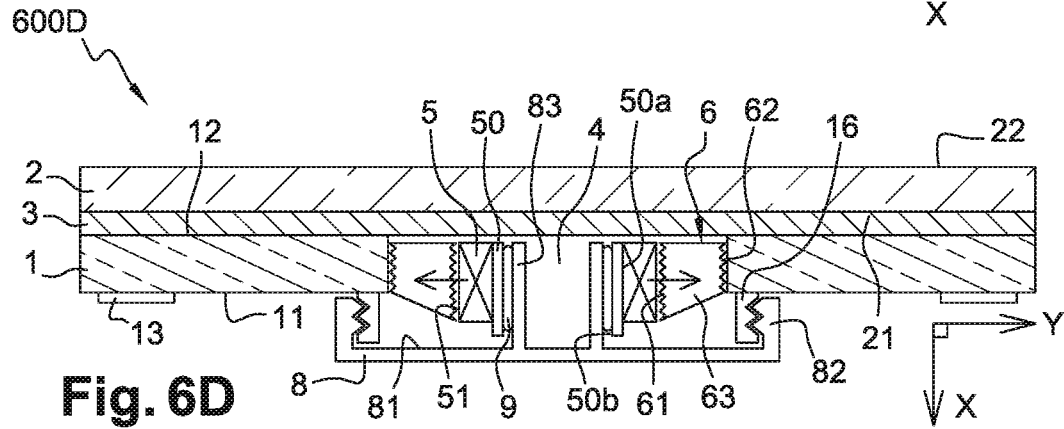

FIG. 6D shows a glazing unit 600D according to a second alternative form of the sixth embodiment. In this alternative form, apart from the lug 83 having an annular shape, the height of the input face 61 is greater than the height of the output face 62. Such is the case for example when the thickness of the first sheet of glass 1 is less than the height of the emission surface 51 of the diodes 5. This configuration makes it possible to compensate for the off-centering caused by this height difference.

Figure 8B:
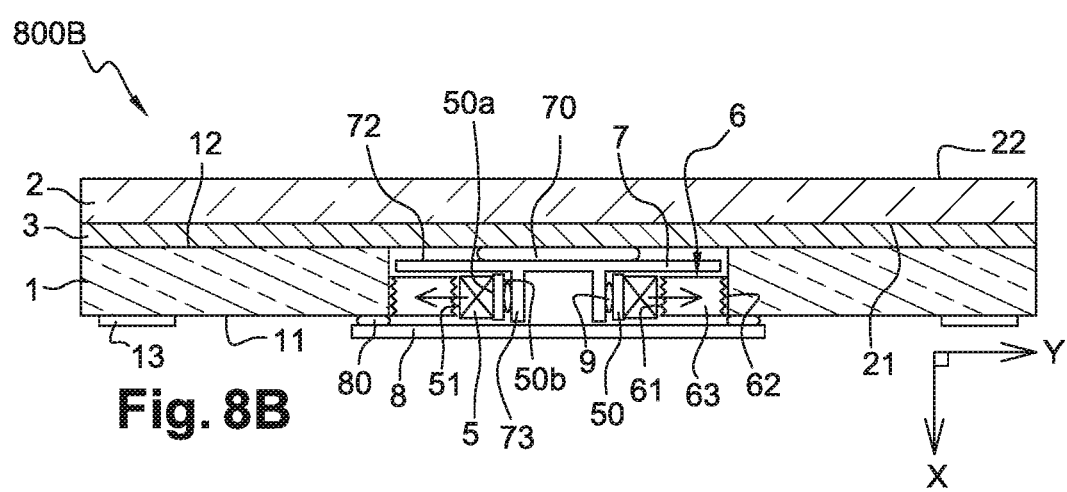
FIG. 8B schematically depicts an alternative form of the glazing unit of FIG. 8A.

FIG. 8B shows a glazing unit 800B according to an alternative form of the eighth embodiment. In this alternative form, the mounting carrier 7 is not reflective. The guide element 6 is then advantageously spaced away from the mounting carrier 7, for example by means of spacers.

Figure 9:
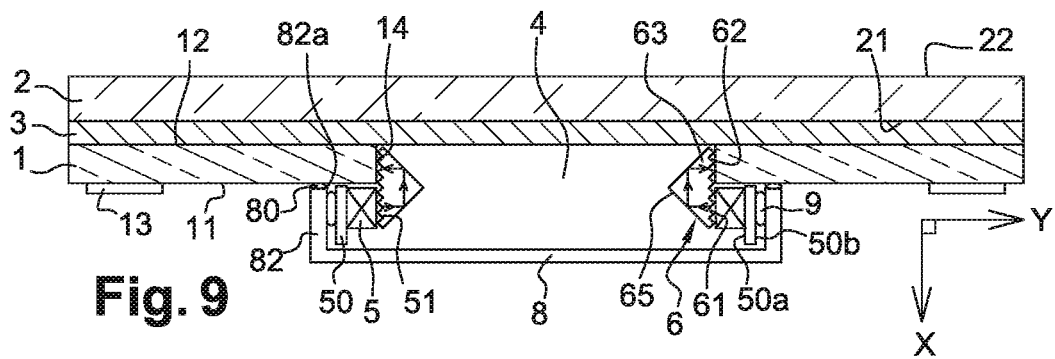
FIG. 9 schematically depicts a ninth embodiment of an illuminating glazing unit according to the invention.

FIG. 9 shows a ninth embodiment of a glazing unit 900 in which the guide element 6 is configured to reflect the light at 180°, similarly to the embodiment of FIG. 4. It is possible for the guide element 6 not to have external walls that can be attached to the lamination interlayer 3 or to the cover 8. In that case, the guide element 6 is advantageously attached to the internal wall 14 formed by the through-hole 4 in the first sheet of glass 1. This attachment is preferably achieved by optical bonding.

In this embodiment, the rim 82 of the cover 8 comprises an end surface 82a via which the cover is attached to the first main surface 11 of the first sheet 1, for example by bonding 80. The diode carrier 50 may then be bonded to an interior wall 82b of the rim 82.

Optionally, the chamfered external walls 65 of the guide element 6 are metallized, which means to say that they are covered with a reflective layer containing metal.

Figure 10:
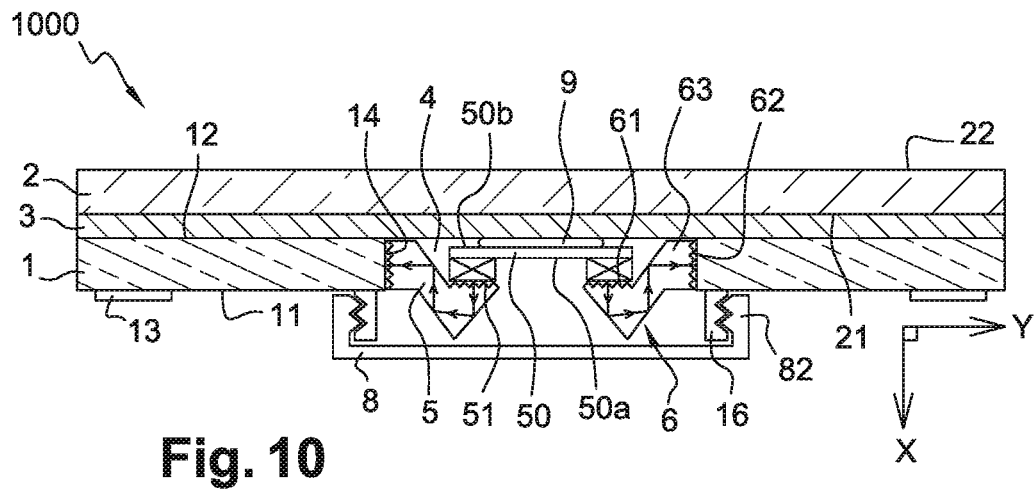
FIG. 10 schematically depicts a tenth embodiment of an illuminating glazing unit according to the invention.

FIG. 10 shows a tenth embodiment of a glazing unit 1000 in which the top-emitting diodes 5 are arranged in such a way as to emit light in the first direction X, toward the inside of the vehicle. In this case, the guide element 6 comprises a 45° deflection to guide the light as far as the internal wall 14.

Figure 11:
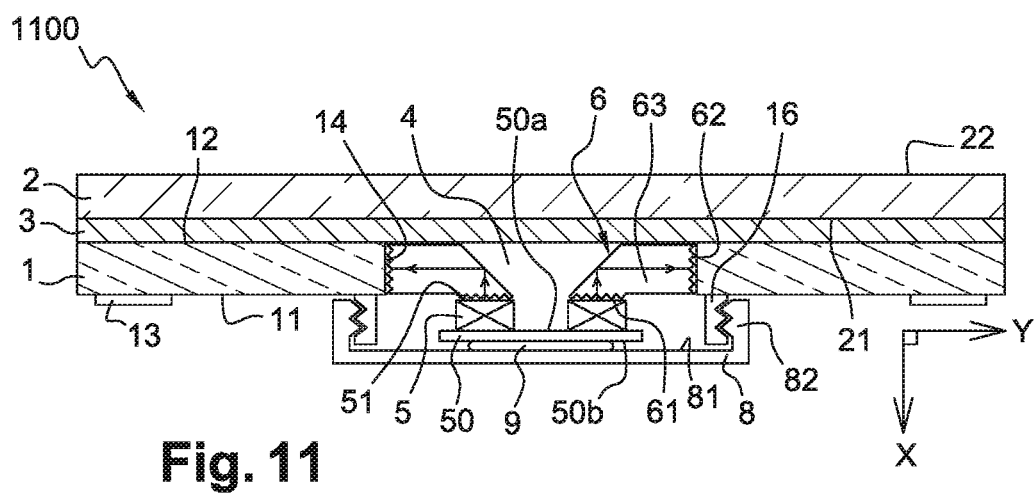
FIG. 11 schematically depicts an eleventh embodiment of an illuminating glazing unit according to the invention.

FIG. 11 shows an eleventh embodiment of a glazing unit 1100, in which the diodes 5 are supported by the cover 8 and their emission surface 51 is oriented toward the bottom of the through-hole 4. In this case, in a similar way to the embodiment of FIG. 10, the guide element 6 comprises a 45° deflection to guide the light as far as the internal wall 14.

Figure 12:
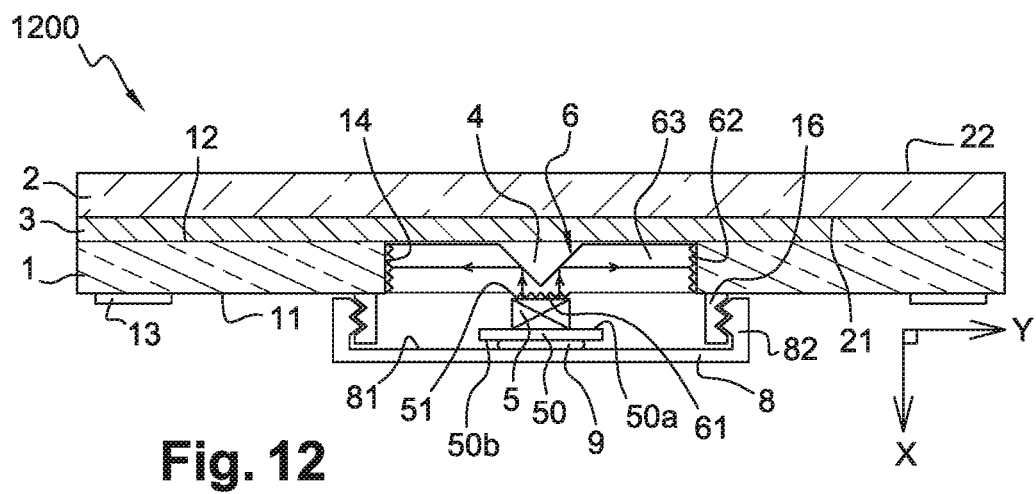
FIG. 12 schematically depicts a twelfth embodiment of an illuminating glazing unit according to the invention.

FIG. 12 shows a glazing unit 1200 according to a twelfth embodiment similar to the embodiment of FIG. 11 but which nevertheless differs therefrom in that the glazing unit 1200 comprises just one single top-emitting diode 5. The use of just one single diode makes it possible to reduce the production cost of the glazing unit. The guide element 6 has, for example, the shape of a disk extending over the entire surface of the through-hole 4. In this case, the input face 61 of the guide element 6 lies in the same plane or in a plane substantially parallel to the first main surface 11 of the first sheet of glass 1. The input face 61 is, for example, positioned at the center of the disk formed by the guide element. The thickness of the guide element 6 is preferably less than or equal to the thickness of the first sheet 1.

Figure 13:
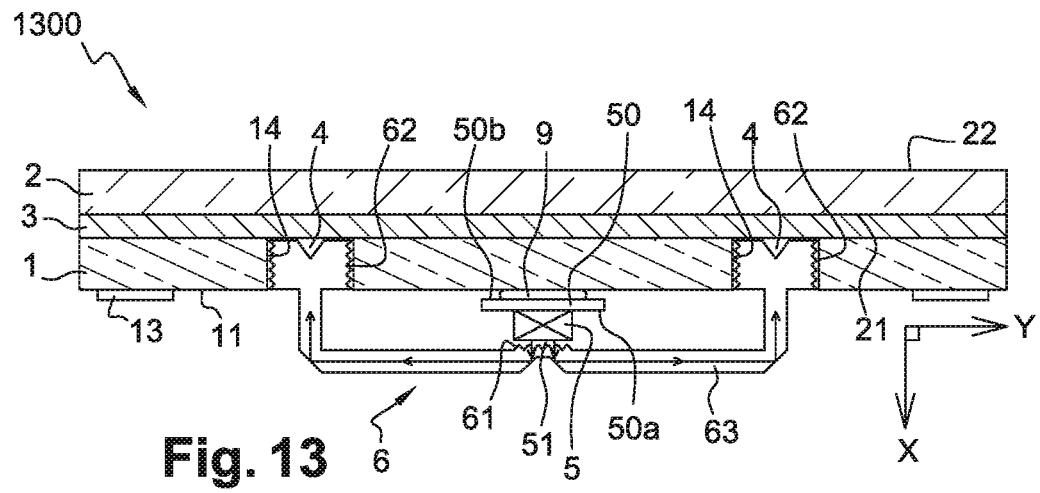
FIG. 13 schematically depicts a thirteenth embodiment of an illuminating glazing unit according to the invention.

FIG. 13 shows a thirteenth embodiment of a glazing unit 1300 comprising several light injection points. Specifically, the first sheet 1 is pierced with several through-holes 4, each through-hole 4 forming an internal wall 14 in the thickness of the first sheet 1.

Advantageously, the glazing unit comprises a single diode 5 and a single guide element 6. The diode 5 is, for example, placed on the first main surface 11 of the first sheet 1, between the through-holes 4. The light emitted by the top-emitting diode 5 is directed in the first direction X, toward the inside of the vehicle. In this embodiment, the guide element 6 comprises several output surfaces 62, each one being positioned facing one of the internal walls 14. By virtue of this configuration, it is possible to inject light at several points along the glazing unit using just one single light source, thereby reducing the production cost of the glazing unit.

Figure 14:
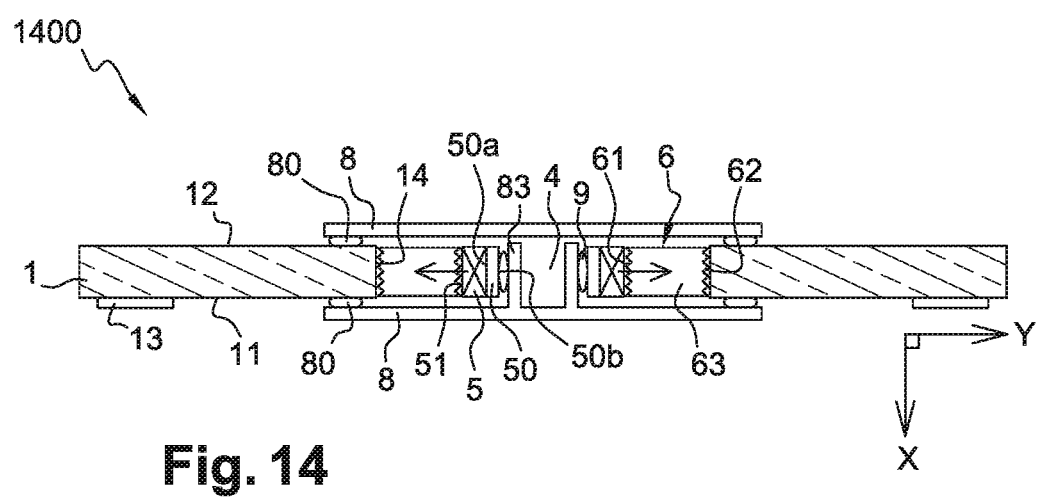
FIG. 14 schematically depicts a fourteenth embodiment of an illuminating glazing unit according to the invention.

FIG. 14 shows a fourteenth embodiment of a glazing unit 1400 in which the guide element 6 and the diodes are configured similarly to the embodiment of FIG. 6A. However, the glazing unit 1400 here is a single-glazing unit, which means to say that it comprises just one (the first) sheet of glass 1. Another cover 8 fixed on the second main surface 12 of the first sheet of glass 1 advantageously closes the through-hole 4.

In this embodiment, the light extraction means 13 may, with equal preference, be arranged on the first main surface 11 and/or on the second main surface of the first sheet of glass 1.

Figure 15:
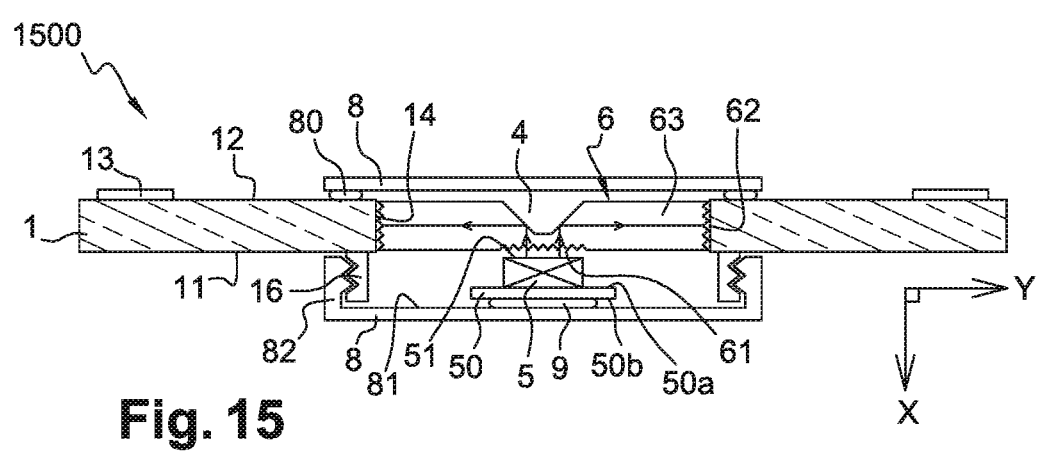
FIG. 15 schematically depicts a fifteenth embodiment of an illuminating glazing unit according to the invention.

FIG. 15 shows a fifteenth embodiment of a glazing unit 1500 in which the guide element 6 and the diodes are configured similarly to the embodiment of FIG. 12. However, the glazing unit 1500 is likewise here a single-glazing unit, as in the embodiment of FIG. 14.

Naturally, the invention is not restricted to the embodiments described with reference to the figures, and alternative forms are conceivable without departing from the scope of the invention.

The invention claimed is:

1. An illuminating glazing unit comprising:
    a first transparent sheet of glass or plastic drilled with a through-hole delimited by an internal wall,
    a plurality of inorganic light-emitting diodes each comprising an emission surface for emitting light in a main direction of emission substantially orthogonal to the emission surface, and
    a light guide element having an outer periphery and comprising an input face arranged facing the emission surface, a body and an output face arranged facing the internal wall,
    wherein the light guide element extends along the internal wall of the through-hole and is common to said plurality of inorganic light-emitting diodes such that the input face of the light guide element receives light emitted by each of said plurality of inorganic light-emitting diodes, wherein the input face and the ouput face of the light guide element each form at least part of the outer periphery of the light guide element.

2. The glazing unit as claimed in claim 1, wherein the input face is spaced away from the emission surface, or is in optical contact via an adhesive with the emission surface or is in physical contact, and/or the output face is spaced away from the internal wall or is in optical contact via an adhesive or is in physical contact.

3. The glazing unit as claimed in claim 2, wherein the output face is in optical contact via an adhesive with the internal wall.

4. The glazing unit as claimed in claim 1, wherein the body is housed in the through-hole, the input face being a non-planar surface, and/or the output face being a non-planar surface.

5. The glazing unit as claimed in claim 4, wherein the non-planar input face is equipped with a light redirection system belonging to the following list: a Fresnel lens, a convex lens, a grating, an array of convex micro lenses and a collimation system, the redirection system forming an integral part of the body of the light guide element, or the redirection system being attached to the body of the light guide element by optical bonding.

6. The glazing unit as claimed in claim 1, wherein the input face faces the through-hole or is even in the through-hole.

7. The glazing unit as claimed in claim 1, further comprising a second sheet of glass and a lamination interlayer placed between the first sheet and the second sheet.

8. The glazing unit as claimed in claim 7, wherein the lamination interlayer or the second sheet of glass forms a bottom for the through-hole, the body of the light guide element facing the bottom of the through-hole.

9. The glazing unit as claimed in claim 8, wherein the body of the light guide element comprises a reflective external coating and is assembled in the bottom of the through-hole or assembled on an interior face of a cover closing the through-hole, the cover delimiting a cavity enveloping the through-hole.

10. The glazing unit as claimed in claim 8, wherein the through-hole has a first characteristic dimension in a reference direction, the body of the light guide element being assembled on a mounting carrier that has a second characteristic dimension in the reference direction that is smaller than the first characteristic dimension, the mounting carrier being placed on the lamination interlayer or on the second sheet of glass.

11. The glazing unit as claimed in claim 10, wherein the mounting carrier is reflective or is opaque and wherein, when the light guide element has a transparent free external wall, at least part of the body facing the mounting carrier is spaced away from the mounting carrier.

12. The glazing unit as claimed in claim 1, wherein said light-emitting diodes are positioned facing the first sheet at the periphery of the through-hole.

13. The glazing unit as claimed in claim 1, further comprising a cover closing the through-hole, the cover delimiting a cavity enveloping the through-hole.

14. The glazing unit as claimed in claim 1, wherein the light guide element is assembled with the first sheet by bonding at the interface between the internal wall of the through-hole and the output face of the light guide element using an optical adhesive.

15. The glazing unit as claimed in claim 1, further comprising a light extraction system for extraction of the light guided in the first sheet, the light extraction system being a diffusing layer facing or on one of the main faces of the first sheet or a texturing of one of the main faces of the first sheet, or alternatively diffusing elements in the first sheet.

16. The glazing unit as claimed in claim 1, further comprising a light extraction system for extraction of the light guided in the first sheet, the light extraction system being a diffusing layer facing or on one of the main faces of the first sheet or a texturing of one of the main faces of the first sheet, or alternatively diffusing elements in the first sheet.

17. The glazing unit as claimed in claim 1, wherein the output face of the light guide element extends along an entire periphery of the internal wall of the through-hole.

18. The glazing unit as claimed in claim 1, wherein the output face is a textured output face.

19. The glazing unit as claimed in claim 1, wherein a height of the input face is greater than a height of the output face.

20. The glazing unit as claimed in claim 1, wherein the through-hole has a closed cross section and has a curved shape, wherein the output face of the guide element follows an entire periphery of the through-hole.

21. The glazing unit as claimed in claim 1, wherein said light-emitting diode has an emission cone of at least 80°.

22. An illuminating glazing unit comprising:
a first transparent sheet of glass or plastic drilled with a through-hole delimited by an internal wall,
a plurality of inorganic light-emitting diodes each comprising an emission surface for emitting light in a main direction of emission substantially orthogonal to the emission surface, and
a light guide element having an outer periphery and comprising an input face arranged facing the emission surface, a body and an output face arranged facing the internal wall,
wherein the output face of the light guide element faces and extends along the internal wall of the through-hole and is common to said plurality of inorganic light-emitting diodes such that light emitted by each of said plurality of inorganic light-emitting diodes is transmitted towards the internal wall via said output face of the light guide element, and
wherein the plurality of inorganic light-emitting diodes is arranged such that the emission surface of each of the plurality of inorganic light-emitting diodes is oriented to face the outer periphery of the light guide element and each of the plurality of inorganic light-emitting diodes emits light away from a nearest part of the internal wall, said light guide element being constructed to redirect said light toward the internal wall of the through-hole.

23. The glazing unit as claimed in claim 22, wherein the output face of the light guide element extends along an entire periphery of the internal wall of the through-hole.

24. An illuminating glazing unit comprising:
a first transparent sheet of glass or plastic drilled with a through-hole delimited by a lateral internal wall,
an inorganic light-emitting diode comprising an emission surface for emitting light in a main direction of emission substantially orthogonal to the emission surface, the inorganic light-emitting diode being arranged in the through-hole such that the emission surface of the inorganic light-emitting diode is oriented towards the lateral internal wall of the through-hole, and a light guide element having an outer periphery and comprising an input face arranged facing the emission surface, a body and a textured output face arranged facing the lateral internal wall, wherein the input face and the output face of the light guide element form together at least part of the outer periphery of the light guide element, and wherein the plurality of inorganic light-emitting diodes is arranged in the illuminating glazing unit such that the emission surface of each of the plurality of inorganic light-emitting diodes is oriented to face the outer periphery of the light guide element and each of the plurality of inorganic light-emitting diodes emits light away from a nearest part of the internal wall, said light guide element being constructed to redirect said light toward the internal wall of the through-hole.

* * * * *